Figure 1:
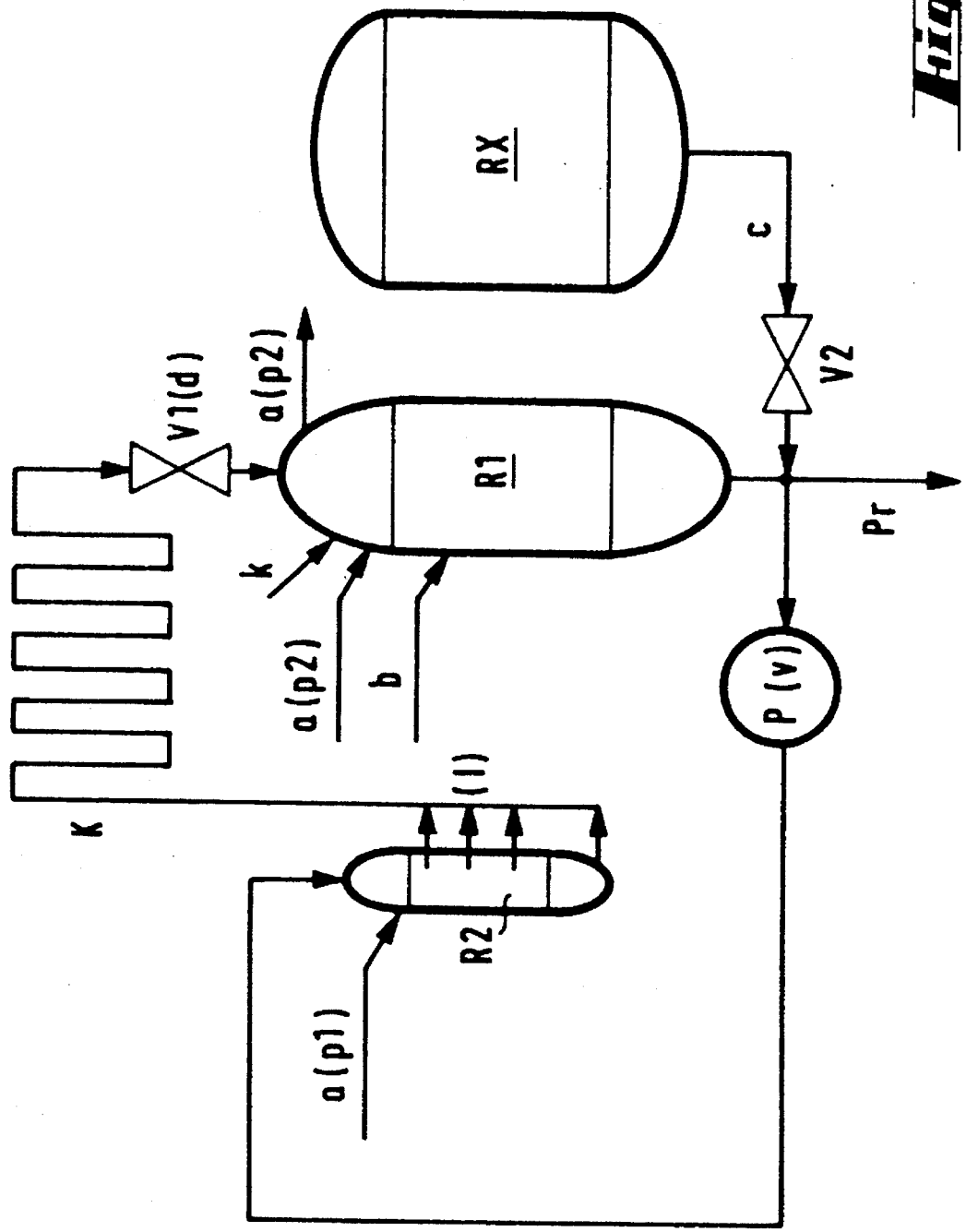

United States Patent [19]

Brekner et al.

[11] Patent Number: 5,475,060

[45] Date of Patent: Dec. 12, 1995

[54] CYCLOOLEFIN BLOCK COPOLYMERS AND A PROCESS FOR THEIR PREPARATION

[75] Inventors: Michael-Joachim Brekner, Frankfurt am Main; Frank Osan; Jürgen Rohrmann, both of Kelkheim, all of Germany

[73] Assignee: Hoechst AG, Frankfurt, Germany

[21] Appl. No.: 240,823

[22] Filed: May 10, 1994

Related U.S. Application Data

[62] Division of Ser. No. 19,094, Feb. 18, 1993, Pat. No. 5,331,057.

[51] Int. Cl.⁶ ............................ C08F 297/08; C08L 53/00
[52] U.S. Cl. ............................ 525/289; 525/297; 525/88; 525/95; 525/97
[58] Field of Search ........................... 525/289, 297, 525/88, 95, 97

[56] References Cited

U.S. PATENT DOCUMENTS

| | | |
|---|---|---|
| 3,932,369 | 1/1976 | Sartori et al. . |
| 4,551,501 | 11/1985 | Shiga et al. ............................ 525/88 |
| 5,087,677 | 2/1992 | Brekner et al. . |
| 5,173,540 | 12/1992 | Saito et al. ............................ 525/247 |
| 5,204,429 | 4/1993 | Kaminsky et al. ...................... 526/308 |

FOREIGN PATENT DOCUMENTS

| | | |
|---|---|---|
| 622337 | 7/1990 | Australia . |
| 0433986 | 6/1991 | European Pat. Off. . |
| 0447035 | 9/1991 | European Pat. Off. . |
| 3835044 | 4/1990 | Germany . |
| 91/12285 | 8/1991 | WIPO . |

OTHER PUBLICATIONS

*Origin and Early Development of Rubber–Toughened Plastics*, Raymond B. Seymour, Depart. of Polymer Science, U. of Southernn Mississippi, Hattiesburg, Md. 39406–0076, pp. 1–64 Advances in Chemistry Series (1989).

*Primary Examiner*—Vasu S. Jagannathan
*Attorney, Agent, or Firm*—Connolly & Hutz

[57] ABSTRACT

Cycloolefin block copolymers and a process for their preparation Cycloolefin block copolymers, which in particular are suitable as phase promoters, are preferably obtained by copolymerization of polycyclic olefins, such as norbornene, with acyclic olefins, such as ethylene, by, at a molecular weight distribution $M_w/M_n$ of the polymer block forming of less than 2, changing the reaction conditions one or more times in such a way that the monomer/comonomer ratio changes by at least 10% or a further polymerizable monomer is metered into the monomer or the monomers.

6 Claims, 3 Drawing Sheets

CYCLOOLEFIN BLOCK COPOLYMERS AND A PROCESS FOR THEIR PREPARATION

This is a divisional of Ser. No. 08/019,094, filed Feb. 18, 1993 now U.S. Pat. No. 5,331,057.

The invention relates primarily to a process for the preparation of cycloolefin block copolymers, the polymer chains being made up of at least two chemically different blocks and the cycloolefin being polymerized without ring opening. The transition from one block to the next can be via an intermediate block, the characteristic feature of which is that in said intermediate block there is a continuous, gradual change in the chemical structure from that of the one block towards the chemical structure of the next block.

The cycloolefin copolymers which can be prepared by known processes (cf. for example EP-A 407 870) have a random or presumably alternating chain structure. However, these copolymers, which, in principle, are suitable for the preparation of a multiplicity of moldings, as a rule have only low toughness which is expressed, for example, in elongations at break of $\leq 8\%$ and in this respect are therefore worth improving.

Cycloolefin copolymers which have high heat distortion resistance also have relatively high melt viscosity.

Block copolymers based on 1-olefins are described in the application WO 91/12285.

One method for improving the toughness of a polymer is to mix the corresponding polymer with a so-called flexible phase, a polymer which has a distinctly lower glass transition temperature. Because of the content of flexible component, mixtures of this type in principle also have lower melt viscosity.

It is very frequently found that mixtures of cycloolefin copolymers having very different glass transition temperatures are not compatible with one another. Incompatibility is as a rule associated with poor mechanical properties if care is not taken that good phase binding results.

A common method for improving phase binding is the admixture of a polymer phase promoter, the characteristic feature of which is that its chain is physically or chemically anchored both in the first and in the second phase (cf. Rubber Toughened Plastics, Advances in Chemistry Series, Washington DC, 222, 1989; pp. 3–64).

The object on which the invention is based was thus to find a phase promoter for cycloolefin copolymers of different glass transition temperatures and a process for its preparation.

It has been found, surprisingly, that when the polymerization is conducted in a particular way, based on catalysis using metallocene catalysts, polymers are formed which are very suitable as phase promoters and in various cases even facilitate miscibility of different cycloolefin copolymers. In this context miscibility signifies that the finished polymer mixture has a single glass transition temperature or that the glass transition temperatures of the mixture are closer together than the glass transition temperatures of the pure components.

Kinetic studies have shown that the polymer materials prepared according to the invention are cycloolefin block copolymers.

The invention thus relates to a process for the preparation of a cycloolefin block copolymer, wherein 0.1 to 95% by weight, with respect to the total amount of monomers employed, of at least one monomer of the formulae I, II, III, IV, V or VI

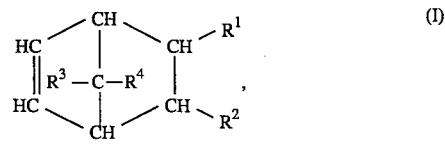

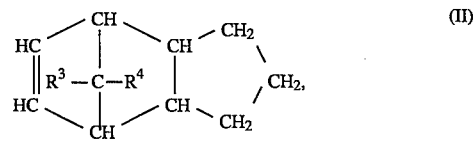

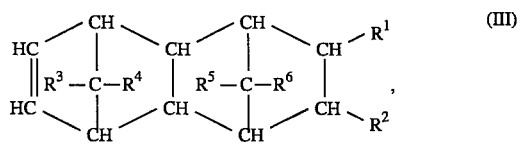

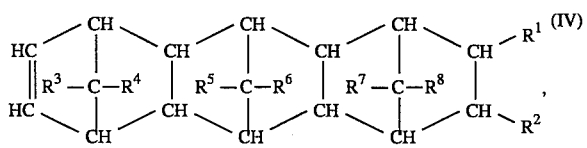

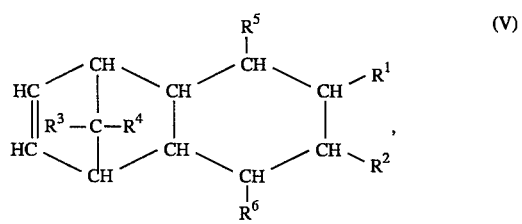

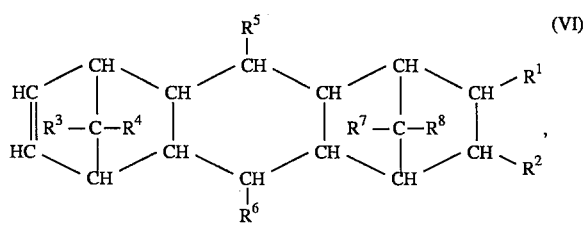

in which $R^1$, $R^2$, $R^3$, $R^4$, $R^5$, $R^6$, $R^7$ and $R^8$ are identical or different and are a hydrogen atom or a $C_1$–$C_8$-alkyl radical, it being possible for the same radicals in the various formulae to have different meanings, 0 to 95% by weight, with respect to the total amount of monomers employed, of a cycloolefin of the formula VII

in which n is a number from 2 to 10, and 0 to 99% by weight, with respect to the total amount of monomers employed, of at least one acyclic olefin of the formula VIII

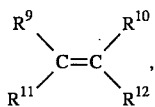  (VIII)

in which $R^9$, $R^{10}$, $R^{11}$ and $R^{12}$ are identical or different and are a hydrogen atom or a $C_1$–$C_8$-alkyl radical, are polymerized at temperatures of −78° to 150° C. and a pressure of 0.01 to 64 bar, in the presence of a catalyst which is composed of a cocatalyst and a metallocene of the formula XI

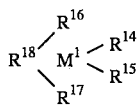  (XI)

in which $M^1$ is titanium, zirconium, hafnium, vanadium, niobium or tantalum, $R^{14}$ and $R^{15}$ are identical or different and are a hydrogen atom, a halogen atom, a $C_1$–$C_{10}$-alkyl group, a $C_1$–$C_{10}$-alkoxy group, a $C_6$–$C_{10}$-aryl group, a $C_6$–$C_{10}$-aryloxy group, a $C_2$–$C_{10}$-alkenyl group, a $C_7$–$C_{40}$-arylalkyl group, a $C_7$–$C_{40}$-alkylaryl group or a $C_8$–$C_{40}$-arylalkenyl group, $R^{16}$ and $R^{17}$ are a mononuclear or polynuclear hydrocarbon radical which can form a sandwich structure with the central atom $M^1$, $R^{18}$ is

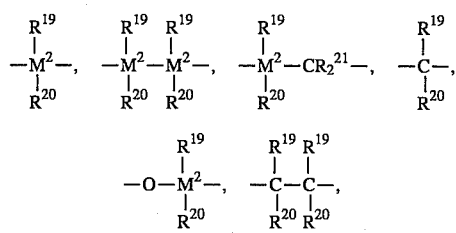

$=BR^{19}$, $=AlR^{19}$, $—Ge—$, $—Sn—$, $—O—$, $—S—$, $=SO$, $=SO_2$, $=NR^{19}$, $=CO$, $=PR^{19}$, or $=P(O)R^{19}$, where $R^{19}$, $R^{20}$ and $R^{21}$ are identical or different and are a hydrogen atom, a halogen atom, a $C_1$–$C_{10}$-alkyl group, a $C_1$–$C_{10}$-fluoroalkyl group, a $C_6$–$C_{10}$-fluoroaryl group, a $C_6$–$C_{10}$-aryl group, a $C_1$–$C_{10}$-alkoxy group, a $C_2$–$C_{10}$-alkenyl group, a $C_7$–$C_{40}$-arylalkyl group, a $C_8$–$C_{40}$-aralkenyl group or a $C_7$–$C_{40}$-alkylaryl group, or $R^{19}$ and $R^{20}$, or $R^{19}$ and $R^{21}$, form a ring, in each case with the atoms linking them, and $M^2$ is silicon, germanium or tin, and, in each case at a molecular weight distribution $M_w/M_n$ of less than 2, always with respect to the polymer block forming, the reaction conditions are changed in such a way that the monomer/comonomer ratio changes by at least 10% or a further polymerizable monomer of the formulae I–VIII is metered into the monomer or the monomers.

The polymerization is carried out in such a way that, depending on the number of changes in the parameters or the monomer composition which are carried out, a two-stage or multi-stage polymerization takes place, it also being possible to polymerize a homopolymer sequence of one of the monomers of the formulae I to VIII in the first polymerization stage.

Alkyl is straight-chain or branched alkyl.

For the purposes of the invention, the monocyclic olefin VII can also be substituted (for example by alkyl or aryl radicals).

The cycloolefin block copolymers prepared according to the invention are novel and are also a subject of the present invention.

Pure monomers of the formulae I to VIII, preferably monomers of the formulae I to VII and in particular of the formulae I or III, or monomer mixtures are used in the first polymerization stage. In all subsequent polymerization stages only monomer mixtures are used.

The monomer mixtures used in the polymerization are mixtures of one or more cycloolefins, in particular of the formulae I or III, with one or more acyclic olefins VIII or mixtures of cycloolefins exclusively. The monomer mixture advantageously comprises 2 monomers, which are preferably a polycyclic olefin of the formula I or III and an acyclic olefin of the formula VIII.

The formulae I or III in particular represent norbornene or tetracyclododecene respectively, it being possible for these to be substituted by ($C_1$–$C_6$)-alkyl. Formula VIII preferably represents 1-olefins, in particular ethylene or propylene.

Cycloolefin block copolymers according to the invention which may be mentioned are, in particular, norbornene/ethylene block copolymers and tetracyclododecene/ethylene block copolymers, in which each polymer sequence or each polymer block is made up of a copolymer and norbornene (in the case of norbornene/ethylene block copolymers) or tetracyclododecene (in the case of tetracyclododecene/ethylene block copolymers) has also been incorporated at least in one polymerization stage. The particularly preferred norbornene/ethylene block copolymers are made up of norbornene/ethylene copolymer sequences of different composition, i.e. they are composed of blocks (polymer segments) which are each norbornene/ethylene copolymers.

The catalyst to be used for the process according to the invention comprises a cocatalyst and at least one metallocene (transition metal component) of the formula XI

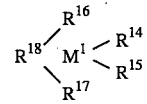  (XI)

In formula XI $M^1$ is a metal selected from the group comprising titanium, zirconium, hafnium, vanadium, niobium and tantalum, preferably zirconium and hafnium. The use of zirconium is particularly preferred.

$R^{14}$ and $R^{15}$ are identical or different and are a hydrogen atom, a $C_1$–$C_{10}$-alkyl group, preferably a $C_1$–$C_3$-alkyl group, a $C_1$–$C_{10}$-alkoxy group, preferably a $C_1$–$C_3$-alkoxy group, a $C_6$–$C_{10}$-aryl group, preferably a $C_6$–$C_8$-aryl group, a $C_6$–$C_{10}$-aryloxy group, preferably a $C_6$–$C_8$-aryloxy group, a $C_2$–$C_{10}$-alkenyl group, preferably a $C_2$–$C_4$-alkenyl group, a $C_7$–$C_{40}$-arylalkyl group, preferably a $C_7$–$C_{10}$-arylalkyl group, a $C_7$–$C_{40}$-alkylaryl group, preferably a $C_7$–$C_{12}$-alkylaryl group, a $C_8$–$C_{40}$-arylalkenyl group, preferably a $C_8$–$C_{12}$-arylalkenyl group, or a halogen atom, preferably chlorine.

$R^{16}$ and $R^{17}$ are identical or different and are a mononuclear or polynuclear hydrocarbon radical which can form a sandwich structure with the central atom $M^1$. $R^{16}$ and $R^{17}$ are preferably indenyl, fluorenyl or cyclopentadienyl. These radicals can be monosubstituted or polysubstituted, in particular by ($C_1$–$C_4$)-alkyl.

$R^{18}$ is a single-membered or multi-membered bridge which links the radicals $R^{16}$ and $R^{17}$ and is preferably

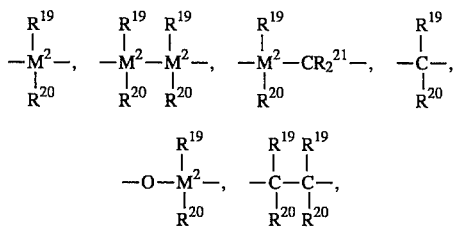

$=BR^{19}$, $=AlR^{19}$, —Ge—, —Sn—, —O—, —S—, $=SO$, $=SO_2$, $=NR^{19}$, $=CO$, $=PR^{19}$ or $=P(O)R^{19}$, where $R^{19}$, $R^{20}$ and $R^{21}$ are indentical or different and are a hydrogen atom, a halogen atom, a $C_1$–$C_{10}$-alkyl group, a $C_1$–$C_{10}$-fluoroalkyl group, a $C_6$–$C_{10}$-aryl group, a $C_1$–$C_{10}$-alkoxy group, a $C_2$–$C_{10}$-alkenyl group, a $C_7$–$C_{40}$-arylalkyl group, a $C_8$–$C_{40}$-arylalkenyl group or a $C_7$–$C_{40}$-alkylaryl group, or $R^{19}$ and $R^{20}$, or $R^{19}$ and $R^{21}$, form a ring, in each case together with the atoms linking them.

$M^2$ is silicon, germanium or tin, preferably silicon or germanium.

The preparation of the metallocenes to be used according to the invention is known (cf. Journal of Organometallic Chem. 288 (1985) 63–67, EP-A 320 762, EP-A 336 128, EP-A 336 127, EP-A 387 690 and EP-A 387 691).

Metallocenes preferably used are: rac-dimethylsilyl-bis (1-indenyl) zirconium dichloride, rac-dimethylgermyl-bis (1-indenyl) zirconium dichloride, rac-phenylmethylsilyl-bis (1-indenyl) zirconium dichloride, rac-phenylvinylsilyl-bis (1-indenyl) zirconium dichloride, 1-silacyclobutyl-bis (1-indenyl) zirconium dichloride, rac-diphenylsilyl-bis (1-indenyl) hafnium dichloride, rac -phenylmethylsilyl-bis (1-indenyl) hafnium dichloride, rac-diphenylsilyl-bis (1-indenyl) zirconium dichloride, rac-ethylene-1,2-bis(1-indenyl)zirconium dichloride, dimethylsilyl-(9-fluorenyl)-(cyclopentadienyl)zirconium dichloride, diphenylsilyl-(9-fluorenyl)-(cyclopentadienyl)zirconium dichloride, diphenylmethylene-(9-fluorenyl)-cyclopentadienyl)zirconium dichloride, isopropylene-(9-fluorenyl)-cyclopentadienyl-zirconium dichloride, phenylmethylmethylene-(9-fluorenyl)-cyclopentadienyl-zirconium dichloride, isopropylene-(9-fluorenyl)-(1-(3-isopropyl)cyclopentadienyl)zirconium dichloride, isopropylene-(9-fluorenyl)(1-(3-methyl)cyclopentadienyl)zirconium dichloride, diphenylmethylene-(9-fluorenyl)(1-(3-methyl)cyclopentadienyl)zirconium dichloride, methylphenylmethylene-(9-fluorenyl)(1-(3-methyl)cyclopentadienyl)zirconium dichloride, dimethylsilyl-(9-fluorenyl)(1-(3-methyl)cyclopentadienyl)zirconium dichloride, diphenylsilyl-(9-fluorenyl)(1-(3-methyl)cyclopentadienyl)zirconium dichloride, diphenylmethylene-(9-fluorenyl)(1-(3-tert.-butyl)cyclopentadienyl)zirconium dichloride, isopropylene-(9-fluorenyl)(1-(3-tert.-butyl)cyclopentadienyl)zirconium dichloride and analogous hafnocenes. Particularly preferred metallocenes are: rac-dimethylsilyl-bis(1-indenyl)zirconium dichloride, rac-phenylmethylsilyl-bis(1-indenyl)zirconium dichloride, rac-phenylvinylsilyl-bis(1-indenyl)zirconium dichloride, rac-diphenylsilyl-bis(1-indenyl)zirconium dichloride, rac-ethylene-1,2-bis(1-indenyl)zirconium dichloride, dimethylsilyl-(9-fluorenyl)-(cyclopentadienyl)zirconium dichloride, diphenylsilyl-(9-fluorenyl)-(cyclopentadienyl)zirconium dichloride, diphenylmethylene-(9-fluorenyl)-cyclopentadienyl-zirconium dichloride, isopropylene-(9-fluorenyl)-cyclopentadienyl-zirconium dichloride or phenylmethylmethylene-(9-fluorenyl)-cyclopentadienyl-zirconium dichloride and analogous hafnocenes.

The cocatalyst used according to the invention is preferably an aluminoxane of the formula (IX)

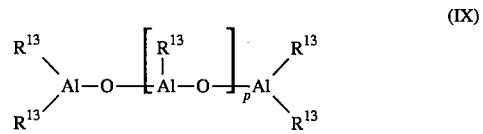

for the linear type and/or of the formula (X)

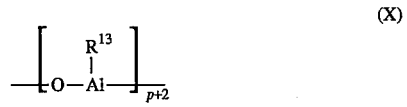

for the cyclic type, where, in the formulae (IX) and (X), the radicals $R^{13}$ can be identical or different and are a $C_1$–$C_6$-alkyl group, a $C_6$–$C_8$-aryl group, benzyl or hydrogen, and p is an integer from 2 to 50, preferably 10 to 35.

The radicals $R^{13}$ are preferably identical and are methyl, isobutyl, phenyl or benzyl, particularly preferably methyl.

If the radicals $R^{13}$ are different, they are preferably methyl and hydrogen or alternatively methyl and isobutyl, the hydrogen or isobutyl content preferably being 0.01–40% (number of radicals $R^{13}$).

The aluminoxane can be prepared in various ways by known processes. One of the methods is, for example, to react an aluminum hydrocarbon compound and/or a hydridoaluminum hydrocarbon compound with water (gaseous, solid, liquid or bound —for example as water of crystallization) in an inert solvent (such as, for example, toluene). In order to prepare an aluminoxane containing different alkyl groups $R^{13}$, two different aluminum trialkyls ($AlR_3+AlR'_3$) are reacted with water in accordance with the desired composition (cf. S. Pasynkiewicz, Polyhedron 9 (1990) 429 and EP-A 302 424).

The precise structure of the aluminoxane is not known.

Irrespective of the mode of preparation, a varying content of unreacted aluminum starting compound, which is in a free form or in the form of an adduct, is common to all aluminoxane solutions.

It is possible to preactivate the metallocene with an aluminoxane of the formula (IX) and/or (X) before it is used in the polymerization reaction. The polymerization activity is distinctly increased by this means.

The preactivation of the transition metal compound is carried out in solution. Preferably, the metallocene is dissolved in a solution of the aluminoxane in an inert hydrocarbon. A suitable inert hydrocarbon is an aliphatic or aromatic hydrocarbon. Toluene is preferably used. The concentration of the aluminoxane in the solution is in the range from about 1% by weight up to the saturation limit, preferably from 5 to 30% by weight, in each case with respect to the total solution. The metallocene can be used in the same concentration, but it is preferably used in an amount of $10^{-4}$—1 mol per mol of aluminoxane. The preactivation time is 5 minutes to 6 hours, preferably 5 to 60 minutes. The preactivation is carried out at a temperature of $-78°$ C. to $100°$ C., preferably $0°$ to $70°$ C.

The metallocene itself can also be prepolymerized or applied to a support or enclosed in a prepolymer (for example on the basis of a metallocene-catalyzed prepolymerization). The (or one of the) olefin(s) used in the polymerization is preferably used for the prepolymerization.

Suitable supports are, for example, silica gels, aluminum oxides, solid aluminoxane or other inorganic support materials. A polyolefin powder in finely divided form is also a suitable support material.

According to the invention, compounds of the formulae $R_xNH_{4-x}BR'_4$, $R_xPH_{4-x}BR'_4$, $R_3CBR'_4$ or $BR'_3$ can be used as suitable cocatalysts, instead of or in addition to an aluminoxane. In these formulae x is a number from 1 to 4, preferably 3, the radicals R are identical or different, preferably identical, and are $C_1$–$C_{10}$-alkyl or $C_6$–$C_{18}$-aryl, or 2 radicals R form a ring together with the atom linking them, and the radicals R' are identical or different, preferably identical, and are $C_6$–$C_{18}$-aryl, which can be substituted by alkyl, haloalkyl or fluorine.

In particular R is ethyl, propyl, butyl or phenyl and R' is phenyl, pentafluorophenyl, 3,5-bistrifluoromethyl-phenyl, mesityl, xylyl or tolyl (cf. EP-A 277 003, EP-A 277 004 and EP-A 426 638).

When the abovementioned cocatalysts are used, the actual (active) polymerization catalyst comprises the reaction product of metallocene and one of the said compounds. This reaction product is therefore preferably first prepared outside the polymerization reactor in a separate step using a suitable solvent.

In principle, any compound which, on the basis of its Lewis acidity, is able to convert the neutral metallocene into a cation and to stabilize the latter ("labile coordination") is a suitable cocatalyst according to the invention. In addition, the cocatalyst or the anion formed therefrom should not enter into any further reactions with the metallocene cation formed (cf. EP-A 427 697).

Purification with an aluminum alkyl, for example $AlMe_3$ or $AlEt_3$, is advantageous in order to remove catalyst poisons present in the olefin. This purification can either be carried out in the polymerization system itself, or the olefin is brought into contact with the Al compound before it is added to the polymerization system and then separated off again.

If a small amount of solvent is added to the reaction mixture, the solvents used are conventional inert solvents, such as, for example, aliphatic or cycloaliphatic hydrocarbons (for example cyclohexane, dekalin), gasoline fractions or hydrogenated diesel oil fractions or toluene.

The polymerization takes place in dilute solution (<80% by volume cycloolefin), in concentrated solution (>80% by volume cycloolefin) or directly in the liquid undiluted cycloolefin monomer.

Depending on the activity of the catalyst and on the desired molecular weight and the desired molecular weight distribution of the particular polymer block, the temperature and reaction time must be matched accordingly. The monomer concentration and the nature of the solvent must also be taken into account, especially as these parameters essentially determine the relative rates of incorporation of the monomers and thus are decisive for the glass transition temperature and heat distortion resistance of the polymers.

The lower the polymerization temperature is chosen within the range from −78° to 150° C., preferably between −78° and 80° C. and particularly preferably between 20° and 80° C., the longer can be the polymerization time for virtually the same range of molecular weight distribution $M_w/M_n$ for the particular polymer blocks.

If the sudden change in the reaction conditions takes place at a time at which the molecular weight distribution $M_w/M_n$ of the polymer block forming is 1, it can reliably be assumed that all of the polymer blocks formed in this polymerization stage possess a catalyst-active chain end (i.e. the chains are so-called live polymer chains) and thus a further block can be polymerized onto these chain ends by changing the polymerization conditions. For this extreme case coupling is 100%. The more the molecular weight distribution $M_w/M_n$ of the polymer blocks formed in a polymerization stage deviates from 1, i.e. $M_w/M_n > 1$, the greater is the increase in the number of catalyst-inactive chain ends (i.e. so-called dead chain ends or stopped chains), which are no longer capable of coupling a further block.

For the process according to the invention for the preparation of block copolymers this signifies that the more $M_w/M_n$ of the polymer block X prepared in the polymerization stage X is in the vicinity of the value 1 at the time at which the change in the reaction parameters takes place the greater will be the proportion of block polymer chains in the finished product at which a chemical coupling between block X and block X+1 has been effected.

With respect to the structural homogeneity or purity of the cycloolefin block copolymers this signifies that the time windows for the individual polymerization stages should as far as possible be so chosen that they correspond to an $M_w/M_n$ of the corresponding polymer blocks of virtually 1, in order to obtain cycloolefin block copolymers of high purity and high structural homogeneity.

If it is also desired to trigger a specific molecular weight of a polymer block, the reaction time must also be adjusted to the desired molecular weight.

Figure 3:
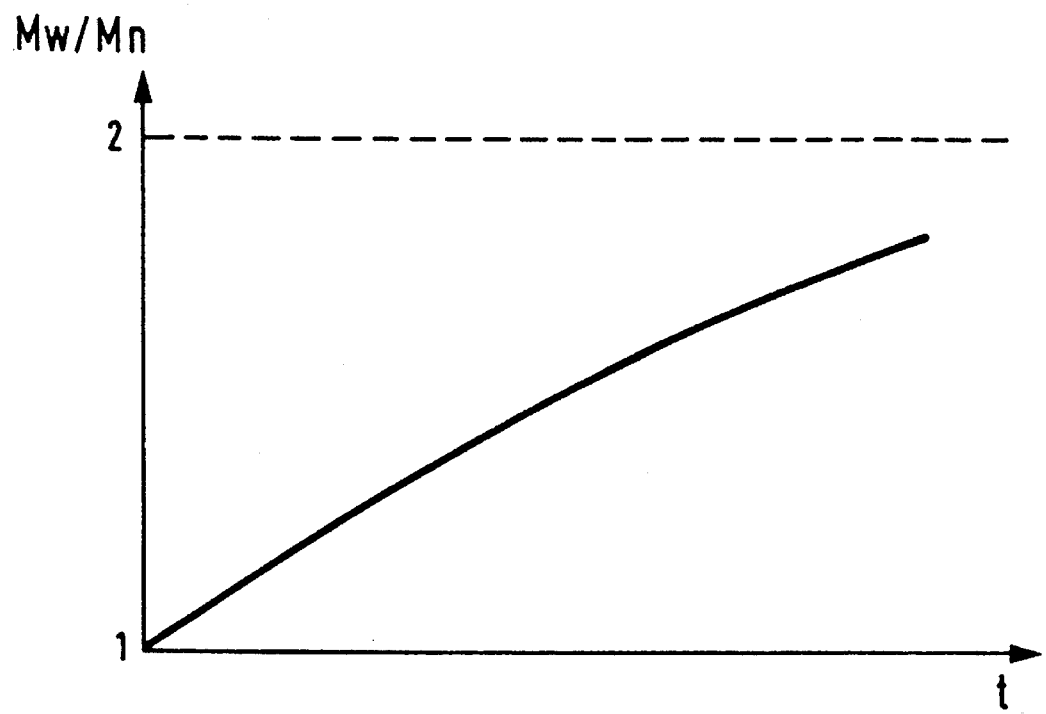

The determination of the requisite reaction time before the reaction conditions are changed, which varies depending on the said reaction parameters and the rate of cycloolefin incorporation, is carried out by means of a calibration by simple sampling as described in the illustrative embodiments. Diagrams from which the requisite times can then be taken (predetermined) can be plotted from test series. FIG. 3, which generally shows the dependence of the molecular weight distribution $M_w/M_n$ of a polymer block on the reaction time t, is an example of such a diagram.

With the exception of the first polymerization stage in a discontinuous process, the calibration to determine the reaction time for all polymerization stages in discontinuous and continuous processes must be carried out in separate single-stage experiments in which—except for the reaction time—the particular reaction conditions of the corresponding polymerization stage are used.

In the case of a copolymerization stage, the molar monomer ratio in the reaction medium of cycloolefins to acyclicolefins or of a cycloolefin to the other cycloolefins, if no acyclic olefins are used, is then changed accordingly at the time at which the reaction conditions are changed. The change in the monomer ratio should amount to at least 10%, preferably more than 25%.

If the first polymerization stage is a homopolymerization (for example polymerization of norbornene), at least a second monomer enters the reaction chamber at the time at which the change is made.

During a polymerization stage, or the formation of a polymer block, the monomer ratios in the reaction chamber are as a rule kept constant, so that chemically uniform polymer blocks are formed. However, it is also possible continually to change the monomer ratios during a polymerization stage, which then leads to polymer blocks which have a structural gradient along the polymer chain, i.e. the incorporation ratio (for example the ratio between the number of norbornene units and the number of ethylene units in a part of the polymer block) changes continually along the corresponding polymer block. In the case of polymer blocks which are made up of more than two types of monomer, this gradient can be achieved by continually changing the concentration of a single monomer component. Blocks which have structural gradients can also be produced in those polymerization stages in which the concentration of several monomer components is changed continuously at the same time. The resulting block copolymers are likewise of interest and a subject of the present invention.

The changes in the monomer ratios to be carried out in the process according to the invention can be achieved, for example, by changing the pressure of the acyclic olefin, by changing the temperature and thus the solubility of gaseous olefins, by dilution with solvents under constant pressure of the acyclic olefin or by metering in a liquid monomer. Several of the said parameters can also be changed at the same time.

Both sudden and continuous changes of this type in the monomer ratio—and thus the preparation of block copolymers according to the invention—can be effected both when the reaction is carried out discontinuously and when the reaction is carried out continuously.

Continuous and multistage polymerization processes are particularly advantageous because they make possible economically advantageous use of the cycloolefin. In addition, in continuous processes the cyclic olefin, which can be obtained as residual monomer together with the polymer, can be recovered and recycled to the reaction mixture.

When the polymerization is carried out in this way, the block length can be controlled via the throughput and reaction volume of the various reaction vessels (i.e. these two parameters determine the dwell time in the various reaction locations).

A BRIEF DESCRIPTION OF THE DRAWINGS

Figure 2:
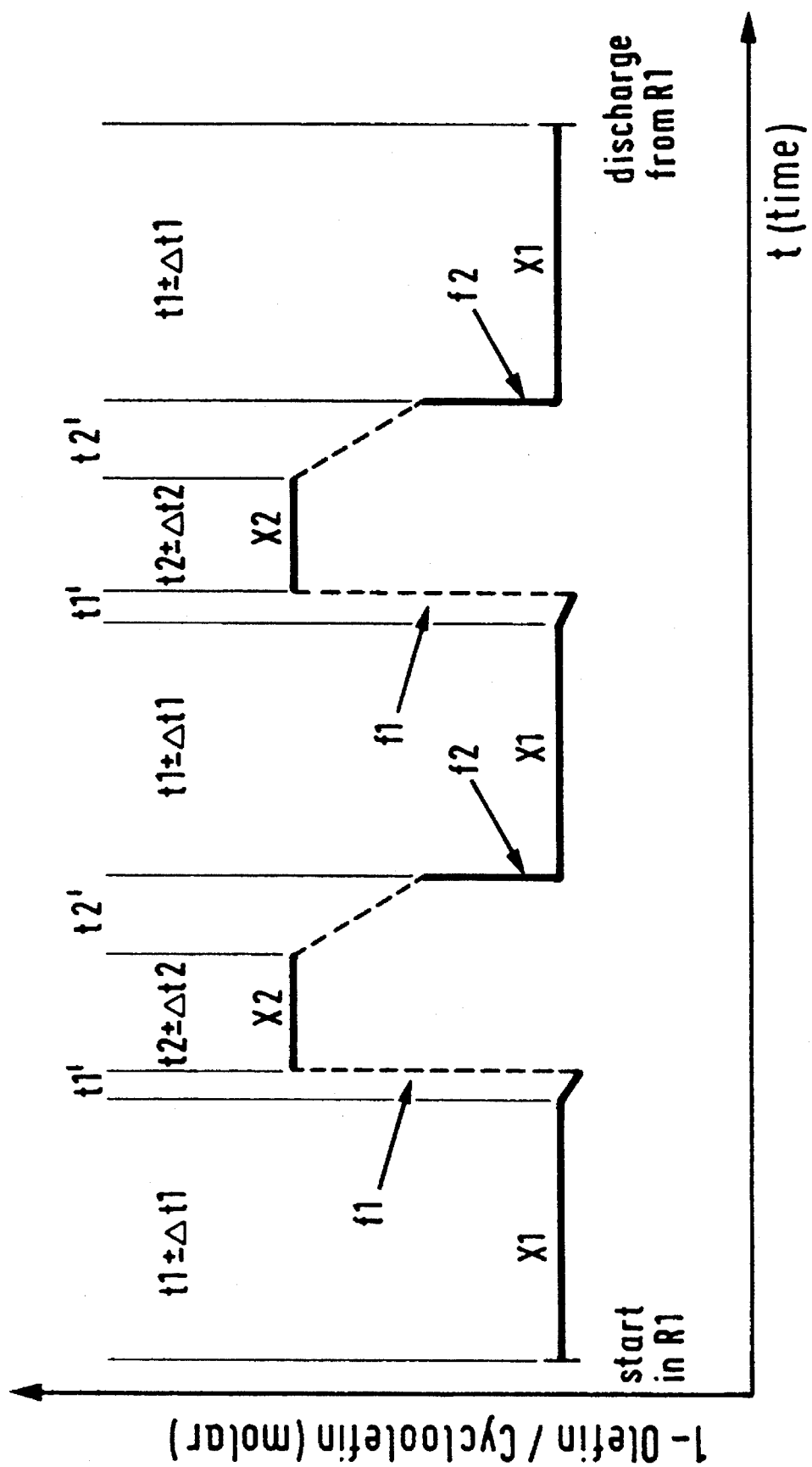

An example of a process of this type is shown diagrammatically by FIGS. 1 and 2.

FIG. 1 shows a possible set-up for a simple continuous procedure, which can be expanded by further elements (reaction vessels etc.) if required. The symbols have the following meanings:

Parameters: pressures p1 and p2, p1>>p2; throughput v; throttling d; level adjustment l;

Parts: stirred vessels R; pump P; tubular reactor K; valves V a=gaseous olefin or olefin mixture;

b=cycloolefin or cycloolefin solution; cycloolefin mixture or solution of cycloolefin mixture c=polymer solution;

k=catalyst;

Pr=product.

FIG. 2 shows an example of the variation profile for the reaction conditions to which the reacting chain end of a block copolymer chain according to the invention can be subjected, assuming two passes through the continuous reaction cycle which is shown diagrammatically in FIG. 1, start and discharge of the chain taking place in reactor chamber R1.

The symbols have the following meanings:

X1=cycloolefin/1-olefin ratio in reaction chamber R1

X2=cycloolefin/1-olefin ratio in reaction chamber R2

$t1 \pm \Delta t1$=dwell time in reaction chamber R1

$t2 \pm \Delta t2$=dwell time in reaction chamber R2

$\pm \Delta$=indicates that a dwell time distribution exists and therefore these times vary about a statistical average value t1';t2'=dwell time in the tubes between R1 and R2 or R2 and R1 (in comparison with R1 and R2, the dwell time distributions in these tube lines are narrow and therefore the indication "$\Delta t$" has been dispensed with here; usually the rate of incorporation of the 1-olefin is greater than that of the cycloolefin, which then leads to a slight change in the monomer ratio in favor of the cycloolefin)

f1;f2=relatively sudden change in the monomer ratio on entering the reaction chamber R2 or R1

An installation according to FIG. 1 can be operated either continuously, i.e. by permanent pump transfer of the reaction solution or permanent metering of the monomers and discharge of the product solution, or discontinuously by batchwise pump transfer of the entire reaction solution from reactor to reactor. The discontinuous variant has the advantage that both block length and the number of blocks per polymer chain can be precisely adjusted. In the case of the continuous procedure, the block length can be accurately controlled, whilst the number of blocks is accessible or adjustable as a statistical average over the achieved average molecular weight of the block copolymer and the aimed-at average molecular weight of the polymer blocks. The preparation of block copolymers which have specific block chain ends can be effected very accurately using the discontinuous procedure, whereas the continuous process enables only statistical information in this respect.

It follows that the described change in the reaction conditions (parameters) can be carried out one or more times, which leads to a sequence of two or more different blocks within a polymer chain. The only condition with which it is necessary to comply is that the particular start of the reaction for the formation of a new block is so chosen that the latter takes place at a time at which —according to the calibration—the molecular weight distribution $M_w/M_n$ of the growing polymer block is still <2, preferably virtually 1. If this condition is complied with, a new block which has a new composition can always be polymerized onto the growing polymer chain. These reaction times vary depending on the catalyst system used, the reaction temperature and the monomer concentration.

If no further new block is to be polymerized on, the polymerization is completed, i.e. discharged or stopped, under the last chosen reaction conditions.

A discontinuous procedure can also be carried out in one reaction vessel in that the change in the reaction conditions and stopping of the reaction are carried out successively in one reactor.

In general the following applies with respect to the reaction parameters: If pure open-chain olefin, for example ethylene, is being injected under pressure, pressures of between 0.01 and 64 bar, preferably 2 to 40 bar and particularly preferably 4 to 20 bar are used. If, in addition to the open-chain olefin, an inert gas, for example nitrogen or argon, is also injected under pressure, the total pressure in the reaction vessel is 4 to 64 bar, preferably 2 to 40 bar and particularly preferably 4 to 25 bar. If the cycloolefinic component is in the undiluted form, a high rate of incorporation of cycloolefin is also achieved at high pressures.

The metallocene compound is used in a concentration, with respect to the transition metal, of $10^{-1}$ to $10^{-8}$, preferably $10^{-3}$ to $10^{-6}$ mol of transition metal per $dm^3$ of reactor volume. The aluminoxane is used in a concentration of $10^{-5}$ to $10^{-1}$, preferably $10^{-4}$ to $2 \times 10^{-2}$ mol per $dm^3$ of reactor volume, with respect to the aluminum content. In principle, higher concentrations are, however, also possible. The other cocatalysts mentioned are preferably used in approximately equimolar amounts with respect to the metallocene.

Apart from the said, bridged metallocenes, metallocenes which have identical or similar non-bridged ligands can, in principle, also be used. In the case of these metallocenes, the reaction times chosen must be distinctly shorter than those for the bridged metallocenes, under comparable reaction conditions.

When preparing copolymers, the molar ratios of the polycyclic olefin to the open-chain olefin (preferably) used can be varied within a wide range. The molar ratios of cycloolefin to open-chain olefin are preferably adjusted to 50:1 to 1:50, in particular 20:1 to 1:20.

The cycloolefin block copolymers according to the invention lead to advantageous mechanical property combinations in blends with other cycloolefin copolymers.

The following examples are intended to illustrate the invention in more detail:

Example 1

A clean and dry 1.5 dm$^3$ polymerization reactor provided with a stirrer was flushed with nitrogen and then with ethylene and filled with 576 ml of an 85% strength by volume solution of norbornene in toluene.

The reactor was then kept at a temperature of 20° C., with stirring, and 2 bar ethylene (excess pressure) was injected under pressure.

20 cm$^3$ of a solution of methyl aluminoxane in toluene (MAO solution) (10.1% by eight of methyl aluminoxane having a molar mass of 1300 g/mol according to cryoscopic determination) were then metered into the reactor and the mixture was stirred for 15 min at 20° C., the ethylene pressure being kept at 2 bar by metering in additional ethylene. In parallel, 60 mg of rac-dimethylsilyl-bis(1-indenyl)zirconium dichloride were dissolved in 10 cm$^3$ of a solution of methyl aluminoxane in toluene (see above for concentration and quality) and preactivated by leaving to stand for 15 minutes. The solution of the complex was then metered into the reactor. Polymerization was then carried out at 20° C., with stirring (750 rpm), the ethylene pressure being kept at 2 bar by metering in additional ethylene.

After 30 min, 50 ml of the reaction solution were removed via a lock. Immediately after this sampling, the ethylene pressure was increased to 7 bar in the course of 10 sec and kept at this pressure for 5 min by metering in additional ethylene. The polymerization was then stopped by adding 10 ml of water via a lock. After subsequent letting-down, the reaction solution was drained into a vessel and then added dropwise to 2 dm$^3$ of acetone, the resulting mixture was stirred for 10 min and the suspended, polymer solid was filtered off.

20 g of polymer which has a glass transition temperature of 140° C. and a viscosity number of 95 ml/g and a molecular weight distribution $M_w/M_n$ of 1.5 were obtained.

After removal, the 50 ml of sample were treated, with stirring, with 0.5 ml of water and then worked up analogously to the abovementioned working-up of the reaction solution of the end product. 4.5 g of polymer which has a glass transition temperature of 165° C., a viscosity number of 150 ml/g and a molecular weight distribution $M_w/M_n$ of 1.3 were isolated from the 50 ml of sample.

Examples 2–4

The procedure was analogous to Example 1 but, in deviation therefrom, the conditions from Table 1 were chosen. The resulting polymer properties are summarized in Table 2.

TABLE 1

| Example No. | Nb solution concentration (% by volume) | Polymerization Stage 1 | | Polymerization Stage 2 | | Amount of metallocene (mg) |
| --- | --- | --- | --- | --- | --- | --- |
| | | Time (min) | Et pressure (bar) | Time (min) | Et pressure (bar) | |
| 2 | 24.4 | 30 | 1 | 15 | 7 | 60.3 |
| 3 | 24.4 | 30 | 1 | 10 | 7 | 92.2 |
| 4 | 48.8 | 30 | 2 | 2 | 8 | 89.9 |

Nb = Norbornene

TABLE 2

| | Sample | | | End product | | |
| --- | --- | --- | --- | --- | --- | --- |
| Example No. | Vn (ml/g) | Tg (°C.) | $M_w/M_n$ | Vn (ml/g) | Tg (°C.) | $M_w/M_n$ |
| 2 | 22 | 167 | 1.2 | 108 | 98 | 1.2 |
| 3 | 27.5 | 165 | 1.2 | 192 | 81 | 1.6 |
| 4 | 73 | 173 | 1.2 | 107 | 134 | 1.3 |

Example 5

A kinetic test was carried out analogously to Example 1. 860 cm$^3$ of an 85% strength by volume solution of norbornene in toluene were used for the polymerization. The reactor temperature was 24° C. and the ethylene excess pressure was kept constant at 6 bar. 60 cm$^3$ of a solution of MAO in toluene (10.1% strength by weight) were added and the mixture was stirred for 15 min. 21 mg of rac-dimethylsilyl-bis(1-indenyl)zirconium dichloride were added to 20 cm$^3$ of MAO solution and after preactivation the mixture was injected into the reactor under pressure.

Samples (50 cm$^3$) were taken via a lock at the reaction times indicated in Table 3. The polymerization was immediately stopped by adding 4 cm$^3$ of isopropanol. The product was washed several times with acetone and dilute hydrochloric acid (see Example 1).

Figure 4:
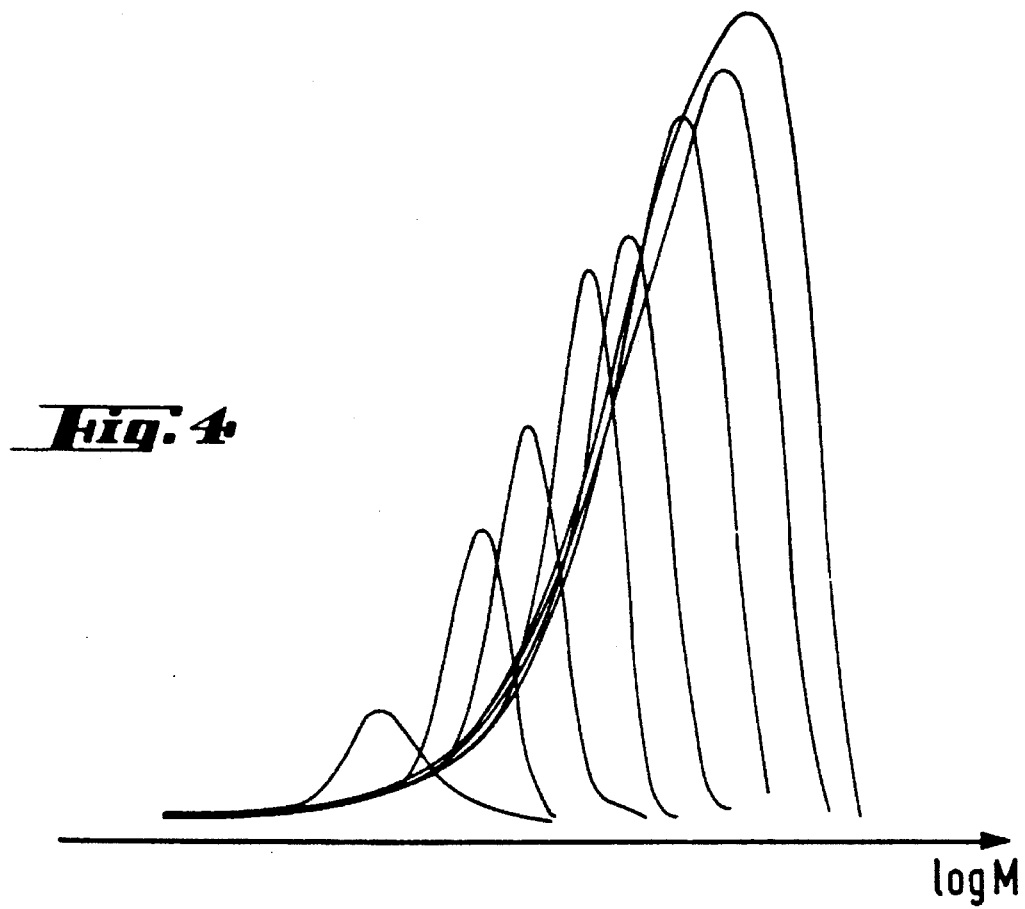

The resulting polymer products were measured by gel permeation chromatography. The number-average molecular weight ($M_n$) and weight-average molecular weight ($M_w$) and the inhomogeneity ($M_w/M_n$) are given in Table 3. The distribution curves for all samples are shown in FIG. 4.

TABLE 3

| Sample No. | Reaction time/min | $M_n \times 10^{-3}$ g/mol | $M_w \times 10^{-3}$ g/mol | $M_w/M_n$ |
| --- | --- | --- | --- | --- |
| 1 | 10 | 21.8 | 24.4 | 1.10 |
| 2 | 20 | 37.3 | 42.8 | 1.15 |

TABLE 3-continued

| Sample No. | Reaction time/min | $M_n \times 10^{-3}$ g/mol | $M_w \times 10^{-3}$ g/mol | $M_w/M_n$ |
|---|---|---|---|---|
| 3 | 30 | 51.0 | 62.0 | 1.22 |
| 4 | 45 | 73.0 | 92.0 | 1.25 |
| 5 | 60 | 83.0 | 121.0 | 1.46 |
| 6 | 90 | 110.0 | 167.0 | 1.52 |
| 7 | 120 | 125.0 | 217.0 | 1.74 |
| 8 | 150 | 153.0 | 261.0 | 1.71 |

FIG. 4 shows the molecular weight distribution functions obtained by gel permeation chromatography for samples Nos. 1–8 from Example 5 from left to right with increasing molecular weight and increasing reaction time. Reaction time and average molecular weights ($M_n$, $M_w$) are given in Table 3.

The area of the distribution function in FIG. 4 is weighted by the yield.

GPC (gel permeation chromatography) measurements were carried out as follows. A type 150-C ALC/GPC Millipore Waters Chrom. chromatograph and a column set comprising 4 Shodex columns of type AT-80 M/S were used. The solvent was o-dichlorobenzene.

Further measurement parameters were:

Temperature: 135° C.

Flow rate: 0.5 ml/min

Sample amount: 0.4 ml of sample solution

Concentration of the sample solution: 0.1 g/dl

Calibration: according to polyethylene standard

Example 6

The procedure was analogous to Example 1 but, in deviation therefrom, the following conditions were chosen:

cycloolefin=tetracyclododecene concentration of the cycloolefin solution=127 g/l amount of cycloolefin solution=860 ml amount of MAO solution=100 ml metallocene=rac-dimethylsilyl-bis(1-indenyl)zirconium-dichloride amount of metallocene=62 mg ethylene pressure maintained by additional metering=3 bar sampling time=after 20 min the cycloolefin concentration was changed by adding pure cycloolefin via a lock.

duration of the addition operation=2 sec amount of cycloolefin metered in=170 g ethylene pressure after addition=3 bar duration of polymerization after metering in=30 min The resulting polymers are distinguished by:

amount of resulting end product=17.5 g amount of polymer from sample=390 mg glass transition temperature of the end product=125° C.

glass transition temperature of the polymer from sample=110° C.

molecular weight Mn of the end product=72,000 g/mol molecular weight Mn of the polymer from sample=52,000 g/mol viscosity number of the end product=105 ml/g viscosity number of the polymer from sample=66 ml/g molecular weight distribution Mw/Mn of the end product=1.9 molecular weight distribution Mw/Mn of the polymer from sample=1.4

Comparison example 1 (comparison example with respect to Example 6)

The procedure was as in Example 6 but, in deviation therefrom, the addition of the pure cycloolefin was already carried out before the addition of the metallocene and thus before the start of the polymerization. The polymerization was stopped after 3 hours. The resulting end product is distinguished by the following characteristics:

glass transition temperature=151° C.

viscosity number=84 ml/g

Example 7

Polymerization experiments were carried out in an installation corresponding to that in FIG. 1. The installation was characterized by the following features:

R1 has a volume of 80 l

R2 comprises a tube in which static mixing elements are fixed

R2 has a volume of 200 ml

K is a cooling tube which has a volume of 15 l

P is a gear pump

The polymerization was carried out in accordance with the following concept:

a solution of cycloolefin in toluene was initially introduced into R1;

pump transfer was carried out using the pump in accordance with a calibration with constant flow rate;

the gaseous olefin was introduced at excess pressure into the circulation flow immediately upstream of the static mixer;

in reactor R1 the pressure was kept constant by controlled letting-off of gas.

The following polymerization conditions were maintained:

cycloolefin: norbornene gaseous olefin: ethylene metallocene: diphenylmethylene-(9-fluorenyl)cyclopentadienylzirconium dichloride amount of norbornene (liquid) initially introduced=10 l amount of toluene initially introduced=30 l amount of MAO solution (MAO solution according to Example 1) initially introduced=1000 ml amount of metallocene (catalyst preparation according to Example 1)=200 mg ethylene excess pressure during the polymerization on the ethylene line=11 bar pressure in R2 immediately downstream of the static mixing elements=10.5 bar pressure in R1 during the polymerization–2.5 bar circulation stream during the polymerization=1500 l/h polymerization temperature:

in R1=40° C.

in R2=43° C.

After the start of the polymerization by addition of the catalyst via a lock, samples were taken regularly at the location in the installation designated by Pr in FIG. 1. The polymerization was stopped after 50 minutes. Working up of the samples and of the end product was carried out analogously to Example 1.

The following properties were determined for samples and end product:

900 ml sample after 10 minutes:
  amount of polymer=0.5 g
  glass transition temperature=140° C.
  viscosity number=62 ml/g
600 ml sample after 20 minutes:
  amount of polymer=1.4 g
  glass transition temperature=137° C.
  viscosity number=109 ml/g
end product after 50 minutes:
  amount of polymer=15 g in 1 l of polymerization solution
  glass transition temperature=134° C.
  viscosity number=160 ml/g

Example 8

Two polymer blends were prepared by mixing 5% strength toluene solutions of the components and then precipitating in acetone and drying the precipitated powder. The following compositions were selected:

Blend I: 3 parts of component A ∓ parts of component B+1 part of component C

Blend II: 3 parts of component A ∓ parts of component B

Component A is a norbornene-ethylene copolymer polymerized in one stage and having a glass transition temperature of 102° C. and a viscosity number of 52 ml/g. The catalyst used for its polymerization was diphenyl- methyl-(9-fluorenyl) -cyclopentadienylzirconium dichloride.

Component B is a norbornene-ethylene copolymer polymerized in one stage and having a glass transition temperature of 178° C. and a viscosity number of 48 ml/g. The catalyst used for its polymerization was diphenyl- methyl-(9-fluorenyl)-cyclopentadienylzirconium dichloride.

Component C is a block copolymer which was prepared by a process according to Example 1 but, in deviation therefrom, the following conditions were chosen:
  amount of norbornene solution=860 ml
  amount of MAO solution=60 ml
  metallocene=diphenylmethylene-(9-fluorenyl)-cyclopentadienylzirconium dichloride
  amount of metallocene=20 mg
  ethylene pressure maintained by additional metering= 6 bar
  sampling time=after 25 min
  time over which the ethylene pressure was changed=20 sec
  second ethylene pressure maintained by additional metering of ethylene=12 bar
  duration of polymerization at the second ethylene pressure=2.5 min The resulting polymers are distinguished by:
  amount of resulting end product=13.5 g
  amount of polymer from sample=370 mg
  glass transition temperature of the end product=126° C.
  glass transition temperature of the polymer from sample=143° C.
  molecular weight $M_n$ of the end product=155,000 g/mol
  molecular weight $M_n$ of the polymer from sample=90,000 g/mol
  viscosity number of the end product=176 ml/g
  viscosity number of the polymer from sample=114 ml/g
  molecular weight distribution $M_w/M_n$ of the end product=1.8
  molecular weight distribution $M_w/M_n$ of the polymer from sample=1.3

After drying in an oven at 80° C. for 18 hours, pressed sheets were produced from both blends at 240° C., 100 bar compression pressure and a pressing time of 15 minutes. The sheets have a diameter of 60 mm and a thickness of 1 mm. Samples, which were used to determine the glass transition temperature, were taken from these sheets.

The following glass transition temperatures were measured:

Blend I: first glass transition temperature=121° C. second glass transition temperature=163° C.

Blend II: first glass transition temperature=105° C. second glass transition temperature=165° C.

As the glass transition temperatures confirm, both blends are two-phase. The increase in the first glass transition temperature in the case of blend I compared with the first glass transition temperature in the case of blend II apparently shows that the corresponding phase has, as a result of the addition of the block copolymer, clearly approached the phase which is characterized by the second glass transition temperature, i.e. the two phases become more compatible.

Example 9

The procedure was analogous to Example 8, the components being polymerized using rac-dimethylsilyl-bis (1-indenyl)zirconium dichloride. Deviating from Example 8, the following characteristics apply:

component A: glass transition temperature=75° C. viscosity number=97 ml/g component B: glass transition temperature=165° C. viscosity number=58 ml/g component C is a block copolymer prepared according to

Example 2.

blend I has a single glass transition temperature of 108° C.

blend II: first glass transition temperature=88° C. second glass transition temperature—142° C.

Example 10

The procedure was analogous to Example 8, the components being polymerized using rac-dimethylsilyl-bis(1-indenyl)zirconium dichloride. Deviating from Example 8, the following characteristics apply:

Blend I: 5 parts of component A+12 parts of component B ∓ parts of component C

Blend II: 5 parts of component A+12 parts of component B component A: glass transition temperature=15° C. viscosity number=145 ml/g component B: glass transition temperature=179° C. viscosity number=112 ml/g component C is a block copolymer prepared according to Example 2 but, in deviation therefrom, the following data apply:
  time for the second polymerization stage=3 min
  Et pressure in the second polymerization stage=14 bar
  $V_n$ of the end product=180 ml/g
  the end product has two glass transition temperatures:
    first glass transition temperature=48° C. second glass transition temperature=148° C.

Mw/Mn of the end product=1.9

Blend I: first glass transition temperature=30° C. second glass transition temperature=156° C.

Blend II: first glass transition temperature=18° C. second glass transition temperature=173° C.

Whereas the pressed plates from blend I had a translucent appearance, the pressed plates from blend II were opaque.

Dumbbell test pieces for mechanical testing were produced from a further portion of the blends prepared. Determination of the notched impact strength carried out on the corresponding dumbbell test pieces in accordance with ISO 180/A gave the following values at a test temperature of 60° C.:

Blend I: 6.3 kJ/m$^2$

Blend II: 4.2 kJ/m$^2$

We claim:

1. A norbornene/ethylene block copolymer, in which each polymer block is made up of a copolymer of norbornene and ethylene.

2. A polymer composition comprising a plurality of phases, said composition containing a cycloolefin block copolymer as claimed in claim 1 as a phase promoter.

3. A method of blending cycloolefin copolymers, comprising: introducing a cycloolefin block copolymer as claimed in claim 1, into a polymer blend comprising a cycloolefin copolymer as a blending compound therefor.

4. A tetracyclododecene/ethylene block copolymer, in which each polymer block is made up of a copolymer of tetracyclododecene and ethylene.

5. A polymer composition comprising a plurality of phases, said composition containing a cycloolefin block copolymer as claimed in claim 4 as a phase promoter.

6. A method of blending cycloolefin copolymers, comprising: introducing a cycloolefin block copolymer as claimed in claim 4, into a polymer blend comprising a cycloolefin copolymer as a blending compound therefor.

* * * * *